United States Patent
Kuki et al.

[19]

[11] Patent Number: 6,127,800
[45] Date of Patent: Oct. 3, 2000

[54] MAGNETIC COUPLING DEVICE FOR CHARGING AN ELECTRIC CAR WHICH INCLUDES SPLIT CORES PROVIDED AT ONE OF A POWER RECEIVING PORTION AND A CHARGING COUPLER

[75] Inventors: Heiji Kuki; Kunihiko Watanabe, both of Yokkaichi; Toshiro Shimada, Osaka, all of Japan

[73] Assignees: Sumitomo Electric Industries, Ltd., Osaka; Sumitomo Wiring Systems, LTD, Yokkaichi, both of Japan

[21] Appl. No.: 09/076,861

[22] Filed: May 13, 1998

[30] Foreign Application Priority Data

May 15, 1997 [JP] Japan .................................... 9-125458

[51] Int. Cl.⁷ .................................................. H01M 10/46
[52] U.S. Cl. ..................................... 320/108; 336/DIG. 2
[58] Field of Search .................................... 320/108, 104, 320/109, 137; 336/DIG. 2

[56] References Cited

U.S. PATENT DOCUMENTS 3,995,209  11/1976  Weston .
5,264,776  11/1993  Hulsey .
5,461,299  10/1995  Bruni ....................................... 320/108
5,539,296   7/1996  Ito ........................................... 320/108
5,680,028  10/1997  McEachern ............................. 320/108
5,850,135  12/1998  Kuki et al. .............................. 320/108

FOREIGN PATENT DOCUMENTS 0 598 924 A1  6/1994  European Pat. Off. .
   6-197479    7/1994  Japan .
   6-197480    7/1994  Japan .
WO 94/09544   4/1994  WIPO .

*Primary Examiner*—Edward H. Tso
*Attorney, Agent, or Firm*—Oliff & Berridge, PLC

[57] ABSTRACT

A C-shaped fixed core is provided at a power receiving portion, and a secondary coil is wound on a vertical portion of the fixed core. A moving core is vertically movable in sliding contact with distal end surfaces of horizontal portions of the fixed core. A primary coil, having an air core portion, is provided at a charging coupler. When the charging coupler is attached to the power receiving portion, the moving core is moved downward to extend through the air core portion of the primary coil, and opposite end portions of the moving core are contacted respectively with the horizontal portions of the fixed core. As a result, a magnetic circuit is formed between the primary and secondary coils. The charging coupler is lightweight since it does not have a core.

9 Claims, 6 Drawing Sheets

मागnetic COUPLING DEVICE FOR CHARGING AN ELECTRIC CAR WHICH INCLUDES SPLIT CORES PROVIDED AT ONE OF A POWER RECEIVING PORTION AND A CHARGING COUPLER

BACKGROUND OF THE INVENTION

1. Field of the Invention

This invention relates to a magnetic coupling device for charging an electric car.

2. Description of the Related Art

A conventional charging connector, which has been put into practical use for charging an electric car, includes a car-side connector, which is mounted on the electric car, and is connected to a car battery, and a power supply connector connected to a charging power source provided outside the car. Therefore, when the car-side connector and the power supply connector are fitted together, electric power is supplied from the charging power source to the car battery, thereby charging the car battery. Terminals of the car-side connector and the power supply connector are fittingly connected together by a male-female fitting construction to form electric paths. However, this structure creates a problem that a large resistance to the fitting operation is involved.

Therefore, a method has been proposed of effecting the charging operation without directly fitting the two connectors together, in which each of the car-side connector and the power supply connector includes a core and a coil, and electric power is supplied from the power supply side to the car side by electromagnetic induction current between the coils.

In this case, however, the cores and coils for the magnetic circuit need to be provided, and the size and weight of the connectors is increased.

Also, the car-side connector of this proposed method is always mounted on the electric car. Therefore if the size of the car-side connector is increased, a large mounting space must be provided in a car body, and also the design of the car body is limited greatly. Further, if the weight of the car-side connector is increased, the running performance is lowered.

On the other hand, in some cases, it is expected that the power supply connector be handy and portable. In such a case, the power supply connector is required to have a lightweight design.

SUMMARY OF THE INVENTION

It is therefore an object of the invention to provide a magnetic coupling device for charging an electric car in which one of a charging side and a power receiving side is lightweight.

According to the invention, a magnetic coupling device is provided for charging an electric car, wherein a battery device of the electric car is charged by an external charging power source. When a. charging coupler, that has a primary coil connected to the external charging power source, is attached to a power receiving portion provided at the electric car, the primary coil and a secondary coil, that is provided at the power receiving portion, can be electromagnetically coupled together by a magnetic circuit passing through the primary and secondary coils. The battery device is charged by an electromotive force which is induced in the secondary coil when the primary coil is excited. Split cores are provided at one of the power receiving portion and the charging coupler, and are coupled together to form the magnetic circuit when the charging coupler is attached to the power receiving portion. Thus, no core is not provided at the other of the charging coupler and the power receiving portion.

In accordance with the magnetic coupling device of the invention, the split core includes a fixed core and a moving core that is movable relative to the fixed core. The moving core is movable in a direction of an axis thereof to be inserted into an air core portion of the coil.

The split cores are normally spaced apart from each other, and are coupled together when the charging coupler is attached to the power receiving portion, so that the magnetic circuit is formed between the primary and secondary coils. The split cores are all provided at one of the power receiving portion and the charging coupler. Therefore, the other of the power receiving portion and the charging coupler is not provided with any of the split cores, which reduces its weight. If the weight of the charging coupler is reduced, the charging coupler can be handled easily. If the weight of the power receiving portion is, reduced, the fuel consumption of the electric car that includes this power receiving portion is improved.

The moving core that forms the moving portion of the split cores is movable in the direction of the axis thereof. Therefore, a space that is required for moving the moving core is elongated and not wide.

BRIEF DESCRIPTION OF THE DRAWINGS

Similar reference characters doenote corresponding features consistently throughout the attached drawings. The preferred embodiments of this invention will be described in detail, with reference to the following figures, wherein.

DETAILED DESCRIPTION OF THE PREFERRED EMBODIMENTS

A preferred embodiment of the present invention will now be described with reference to the drawings.

First Embodiment

Figure 1:
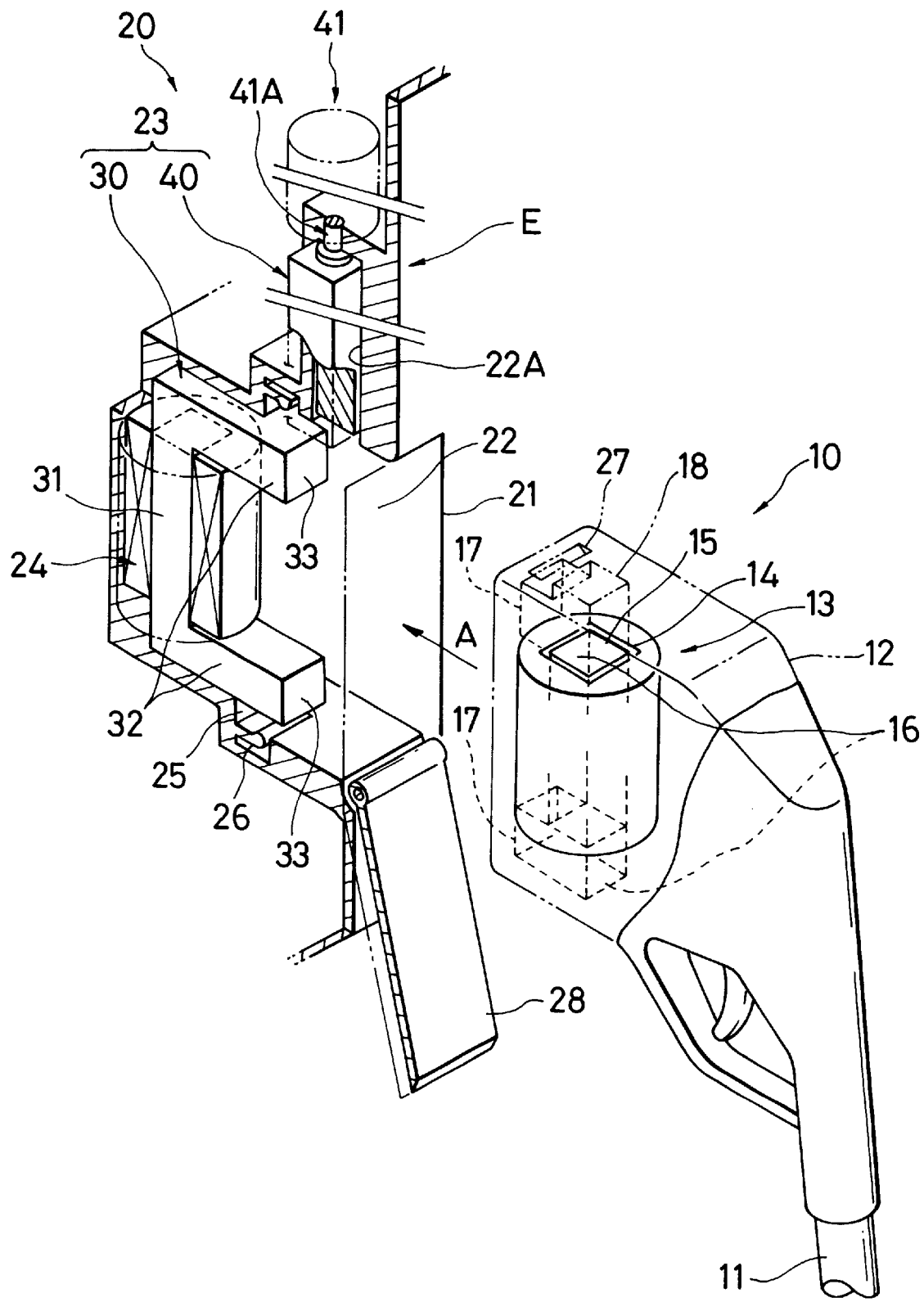
FIG. 1 is a perspective view showing a power receiving portion and a charging coupler of a first embodiment of the invention.

FIG. 1 showes a charging coupler 10 and a power receiving portion 2C, which jointly constitute a magnetic coupling device of this embodiment for an electric car.

The charging coupler 10 is provided at an end of a charging power cable 11 extending from an external charging device (not shown). A primary coil 13, connected to the charging power cable 11, is mounted within a housing 12 of the charging coupler 10. The primary coil 13 is wound on a tubular body 14 of a rectangular cross-section having a thin wall, and an air core portion 15 is formed in the primary coil 13, and extends along an axis thereof. The primary coil 13 is fixed within the housing 12, with its axis extending in an upward-downward direction.

Within the housing 12, spaces 16 and 16 are formed adjacent to upper and lower sides of the primary coil 13, respectively, and communicate with the air core portion 15. The two spaces 16 and 16 are open to the exterior through a pair of front openings 17 and 17, formed in a front surface of the housing 12, and an upper opening 18 formed in an upper surface of the housing 12.

A fixed core 30, provided at the power receiving portion 20, is inserted into the housing 12 through the openings 17. A moving core 40, provided at the power receiving portion 20, is inserted into the housing 12 through the upper opening 18.

The power receiving portion 20 has an open portion 21 which is open to an outer surface of a car body of the electric car. The charging coupler 10 can be inserted into the power receiving portion 20 in a direction indicated by arrow A (FIG. 1) via the open portion. The open portion 21 of the power receiving portion 20 can be closed by a lid 28.

The fixed core 30 is provided within the power receiving portion 20, and is disposed inwardly of a coupler receiving space 22 for receiving the charging coupler 10. The fixed core 30 is formed, for example, by sintering ferrite powder, and includes a bar of a square cross-section formed into a generally C-shape with right-angled corners. The fixed core 30 is fixed within the power receiving portion 20 in such a manner that a vertical portion 31 of this C-shaped body is disposed at the innermost side, whereas horizontal portions 32 and 32 of the C-shaped body extend toward the open portion 21. A secondary coil 24 is wound on the vertical portion 31, and output terminals of the secondary coil 24 are connected to a charging circuit (not shown). A high-frequency electromotive force, induced in the secondary coil 24, is rectified by this charging circuit, thereby charging a power battery (battery device) (not shown) mounted on the electric car. Distal end surfaces 33 and 33 of the horizontal portions 32 and 32 are disposed in a common plane, and the moving core 40 can be moved in sliding contact with the two distal end surfaces 33 and 33.

The power receiving portion 20 has a vertically-elongated space 22A which is disposed above the coupler receiving space 22, and communicates therewith. A linear drive device 41 (e.g. a cylinder or a ball screw) is mounted above the vertically-elongated space 22A. The moving core 40 is secured to a drive portion 41A of the linear drive device 41.

Figure 2:
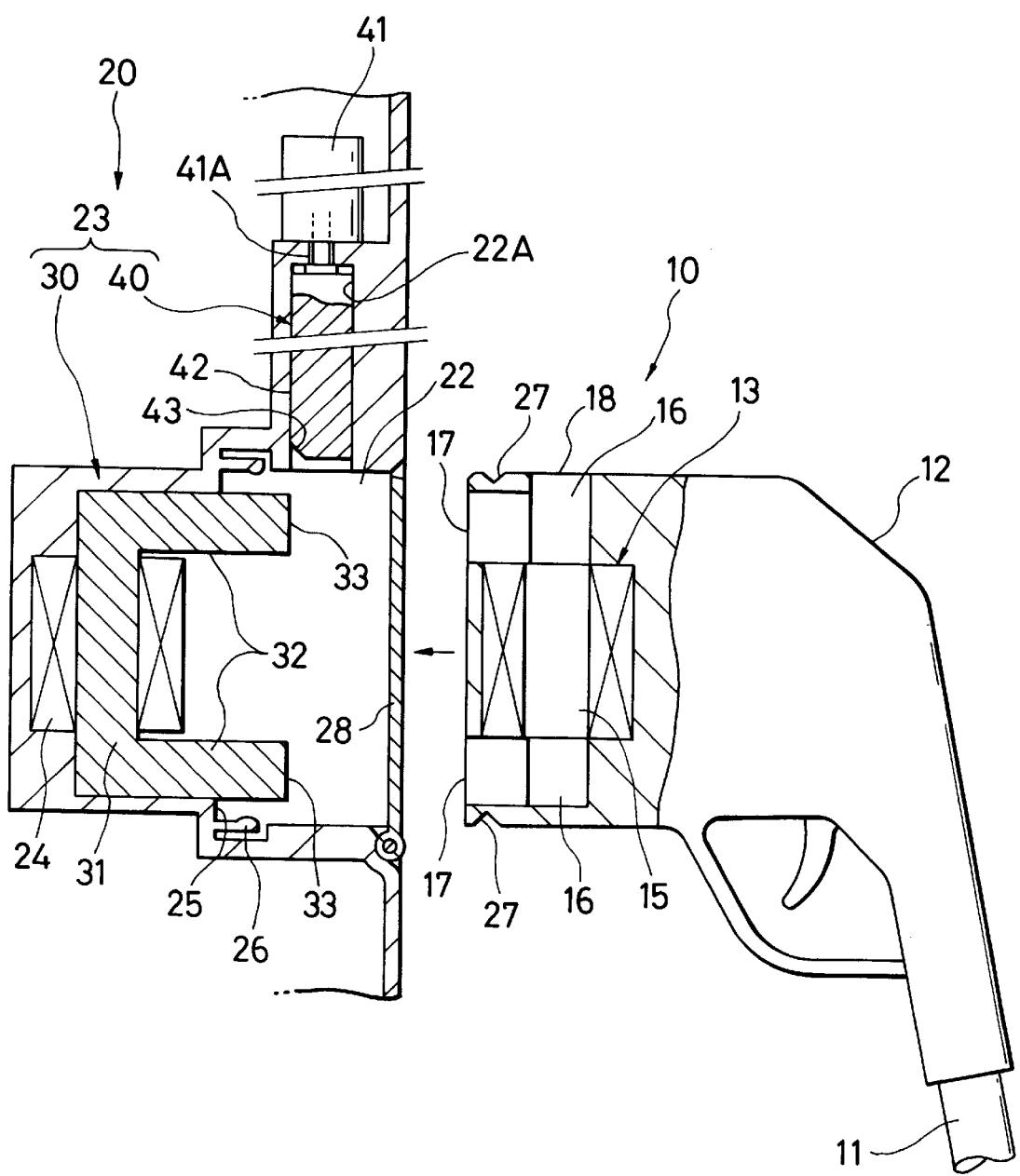
FIG. 2 is a cross-sectional view showing a condition before the charging coupler is attached to the power receiving portion.

The moving core 40 and the fixed core 30 jointly constitute a split core 23. The moving core 40 is formed by sintering ferrite powder, and comprises a bar of a square cross-section. An axis of the moving core 40 extends in a direction of movement of the moving core 40. The moving core 40 is slidingly movable between a position (see FIG. 2) where the moving core 40 is received in the vertically-elongated space 22A, and a position (see FIG. 3) where the moving core 40 is extended into the coupler receiving space 22, with opposite end portions of the moving core 40 facing the distal end surfaces 33 and 33 of the fixed core 30, respectively.

The moving core 40 is prevented from turning about its axis so that one flat side surface 42 (see FIG. 2) of the cross-sectionally square shaped body of the moving core 40 can face the distal end surfaces 33 of the fixed core 30. A slanting surface 43 ijs formed at a lower end portion of the flat side surface 42. The slanting surface 43 can be brought into sliding contact with the distal end surfaces 33, and the moving core 40 can be moved in sliding contact with the distal end surfaces 33.

Step portions 25 and 25 are formed respectively at the upper and lower surfaces of the coupler receiving space 22, and lock piece portions 26 and 26 are formed respectively at these step portions 25 and 25. The lock piece portions 26 and 26 can be engaged respectively in engagement channels 27, formed respectively in the upper and lower surfaces of the charging coupler 10, to hold the charging coupler 10 in a properly-mounted condition.

When the charging coupler 10 is properly mounted, the upper opening 18 in the charging coupler 10 faces the moving core 40 so that the moving core 40 can be inserted into the charging coupler 10. Detection sensors (not shown) are provided respectively at the step portions 25 so as to judge whether or not the charging coupler 10 is properly mounted. The moving core 40 is operated in accordance with a signal from the detection sensors. The linear drive device 41 is operated in response to a charging completion signal from the power battery, and also can be operated by a change-over switch.

The operation of the embodiment of the invention having the above-described structure is discussed below.

For charging the battery device of the electric car, the electric car is parked in the vicinity of the external charging device. The charging coupler 10, hung at a predetermined position (for example, the side of the external charging device), is brought to the power receiving portion 20 of the electric car. The lid 28 of the power receiving portion 20 is opened, and then the charging coupler 10 is pushed into the power receiving portion 20.

As a result, the horizontal portions 32 of the fixed core 30 are inserted into the charging coupler 10 respectively through the front openings 17 and 17. When the distal end surfaces 33 of the horizontal portions 32 are located immediately adjacent to their respective spaces 16 in the charging coupler 10, the charging coupler 10 is properly mounted, so that the lock piece portions 26 of the power receiving portion 20 are engaged respectively in the engagement channels 27 in the charging coupler 10, and also the upper opening 18 in the charging coupler 10 faces the moving core 40. Then, this condition is detected by the detection sensors, and in accordance with this detection signal, the linear drive device 41 is operated to move the moving core 40 downward into the space 16 of the charging coupler 10.

Figure 3:
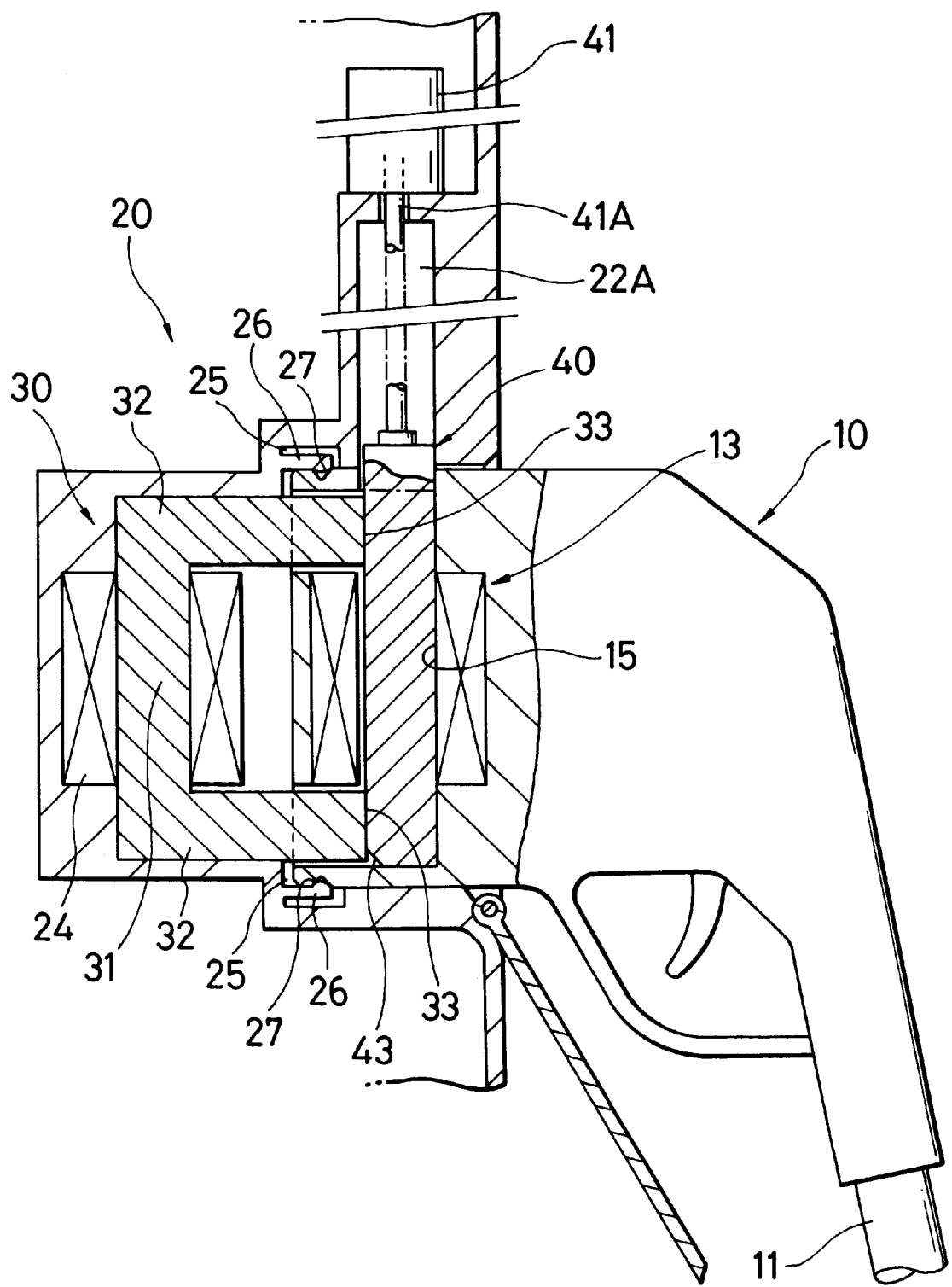
FIG. 3 is a cross-sectional view showing a condition in which the charging coupler is attached to the power receiving portion.

In the space 16, the qlanting surface 43 of the moving core 40 is brought into sliding contact with the fixed core 30, and the moving core 40 is brought into sliding contact with the distal end surface 33 of the fixed core 30, and moves downward. Then, the moving core 40 moves through the air core portion 15 of the primary coil 13, and abuts the bottom of the space 16. In this condition, the two distal end surfaces 33 and 33 of the fixed core 30 are held in contact with the opposite end portions of the moving core 40, respectively, as shown in FIG. 3, and a closed-loop magnetic circuit, passing through the primary and secondary coils 13 and 24, is formed. In this condition, when the power source of the external charging device is turned on, the primary coil 13 is excited, and a magnetic flux is produced in the two cores 30 and 40, so that an electromagnetic induction current flows in the secondary coil 24, and the battery device is charged through the charging circuit.

After the charging is finished, the moving core 40 is moved upward or retracted by the linear drive device 41, and is received in the vertically-elongated space 22A. Then, the charging coupler 10 is withdrawn, and is returned to the predetermined position.

The advantages of this invention are as follows.

(1) Since no core is provided at the charging coupler 10 to be handled by the operator, the weight of the charging coupler 10 is less than a conventional charging coupler having a core, and the charging coupler 10 can be handled easily.

(2) In the electric car, with respect to the magnetic circuit, the space, occupied by the moving core 40, is smaller than the space occupied by the fixed core 30 (as shown in FIG. 3, the moving core 40 is smaller than the fixed core 30 by an amount corresponding to the horizontal portions 32 and 32), and therefore the space, required for moving the moving core 40, is smaller.

(3) The moving core 40 has a narrow, elongated shape, and is movable in the direction of the axis thereof, and therefore the space, required for moving the core 40, is elongated, and is not wide in the horizontal direction.

(4) The secondary coil 24 is mounted on the fixed core 30, and no coil is wound on the moving core 40, which prevents a situation in which wires of such a coil are pulled when moving the moving core 40.

Second Embodiment

Figure 4:
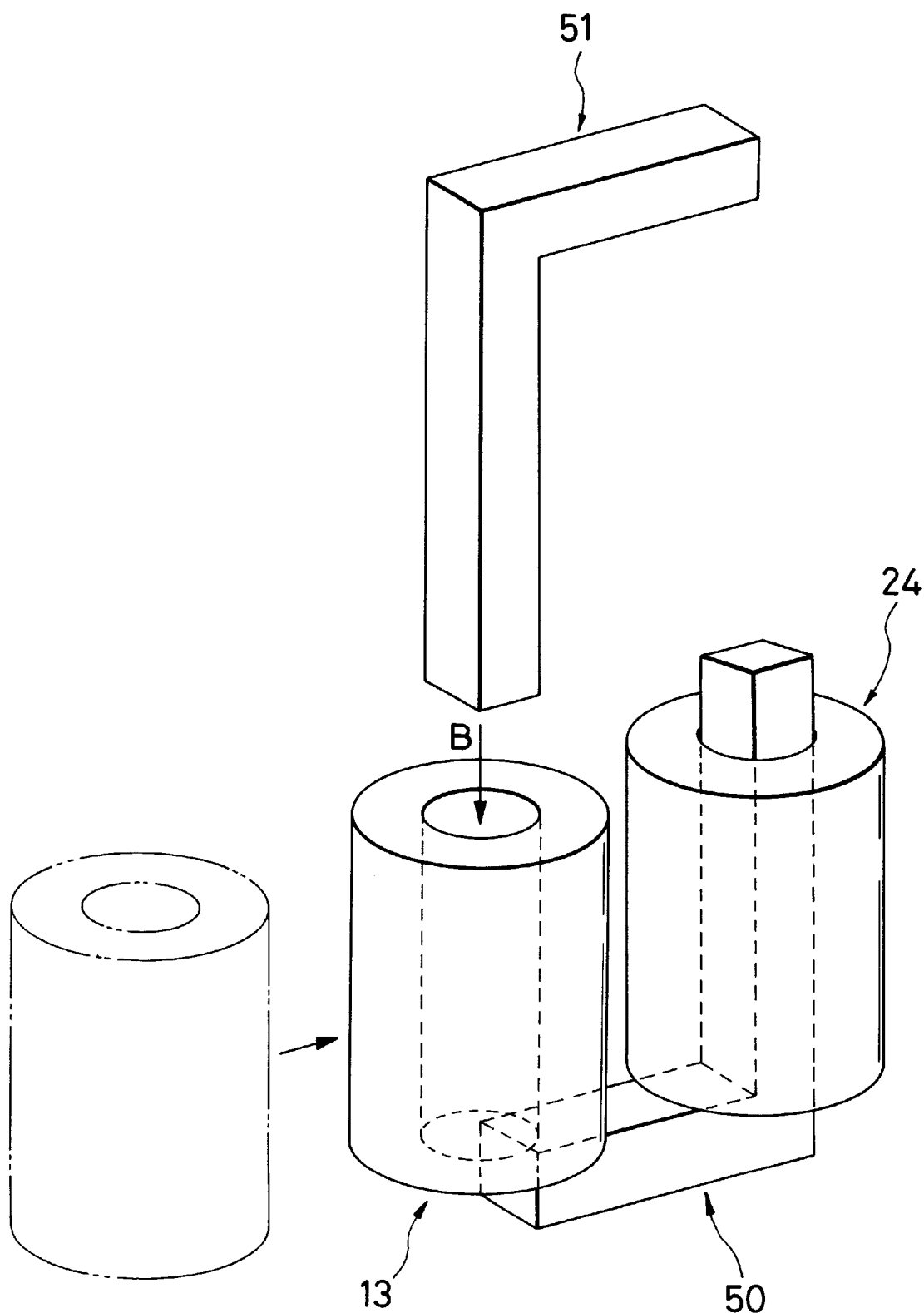
FIG. 4 is a perspective view showing a fixed core and a moving core in accordance with a second embodiment of the invention.

The second embodiment of the invention uses a fixed core that have a different structure than those of the first embodiment. The fixed core 50 and the moving core 51 are shown in FIG. 4. In this embodiment, as shown in FIG. 4, the fixed core 50 and the moving core 51 are both formed into an L-shape. The moving core 51 has an inverted L-shape and is movable in a direction indicated by arrow B into and out of contact with the fixed core 50. A vertical portion and a horizontal portion of the moving core 51 can be contacted at their end portions with a horizontal portion and a vertical portion of the fixed core 50 to form a closed-loop magnetic circuit. The rest of the structure is the same as that of the first embodiment, and therefore explanation thereof will be omitted.

With this structure, the charging coupler can also be reduced in weight as in the first embodiment. Further, the fixed core 50 and the moving core 51 have the same shape, and common parts can be used, which reduces the cost.

Other Embodiments

The invention is not limited to the above embodiments, and for example, the following embodiments fall within the scope of the invention. Further, various modifications other than the following can be made without departing from the scope of the invention.

Figure 5:
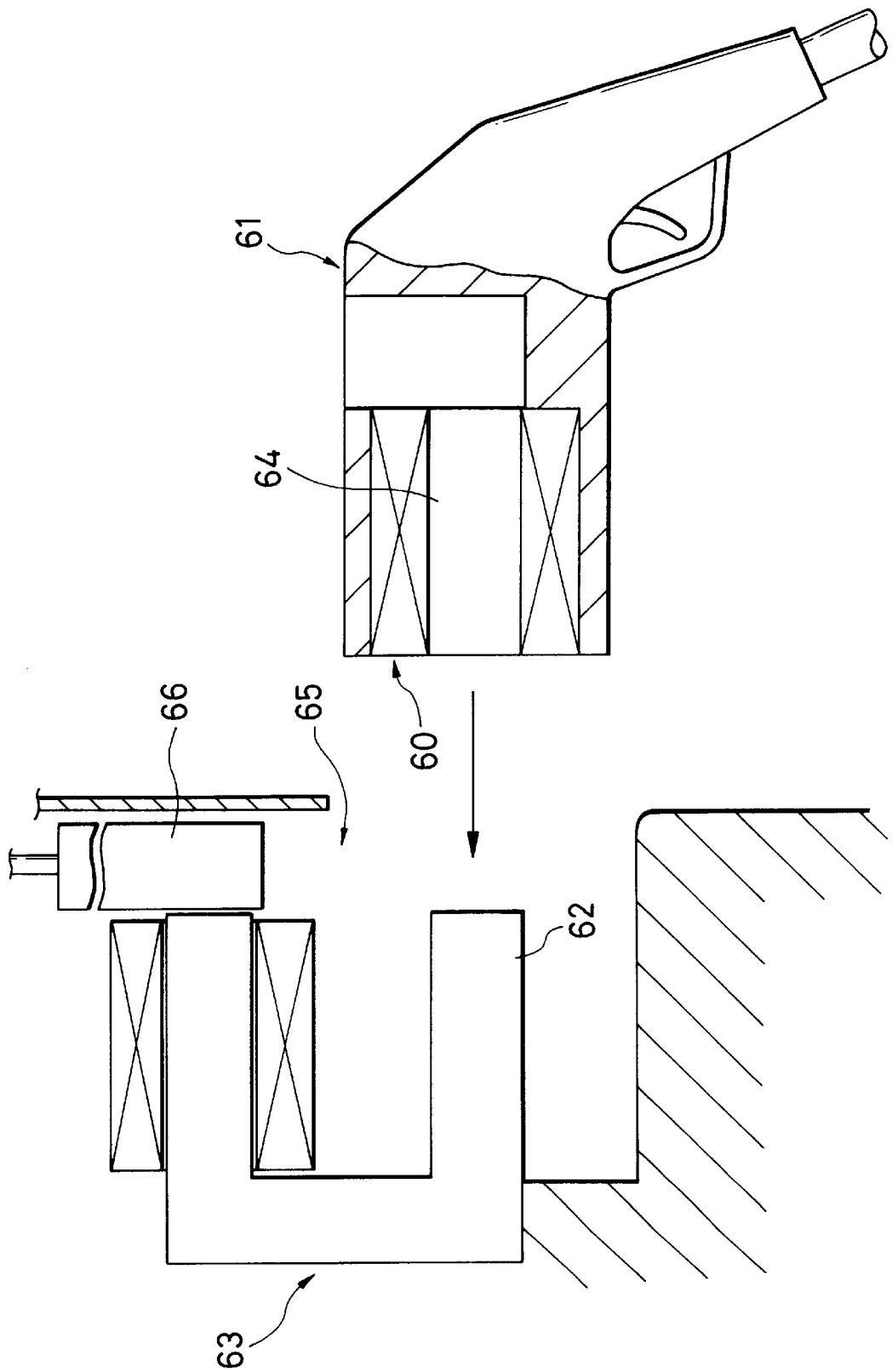
FIG. 5 is a cross-sectional view showing a modified power receiving portion and a modified charging coupler.
Figure 6:
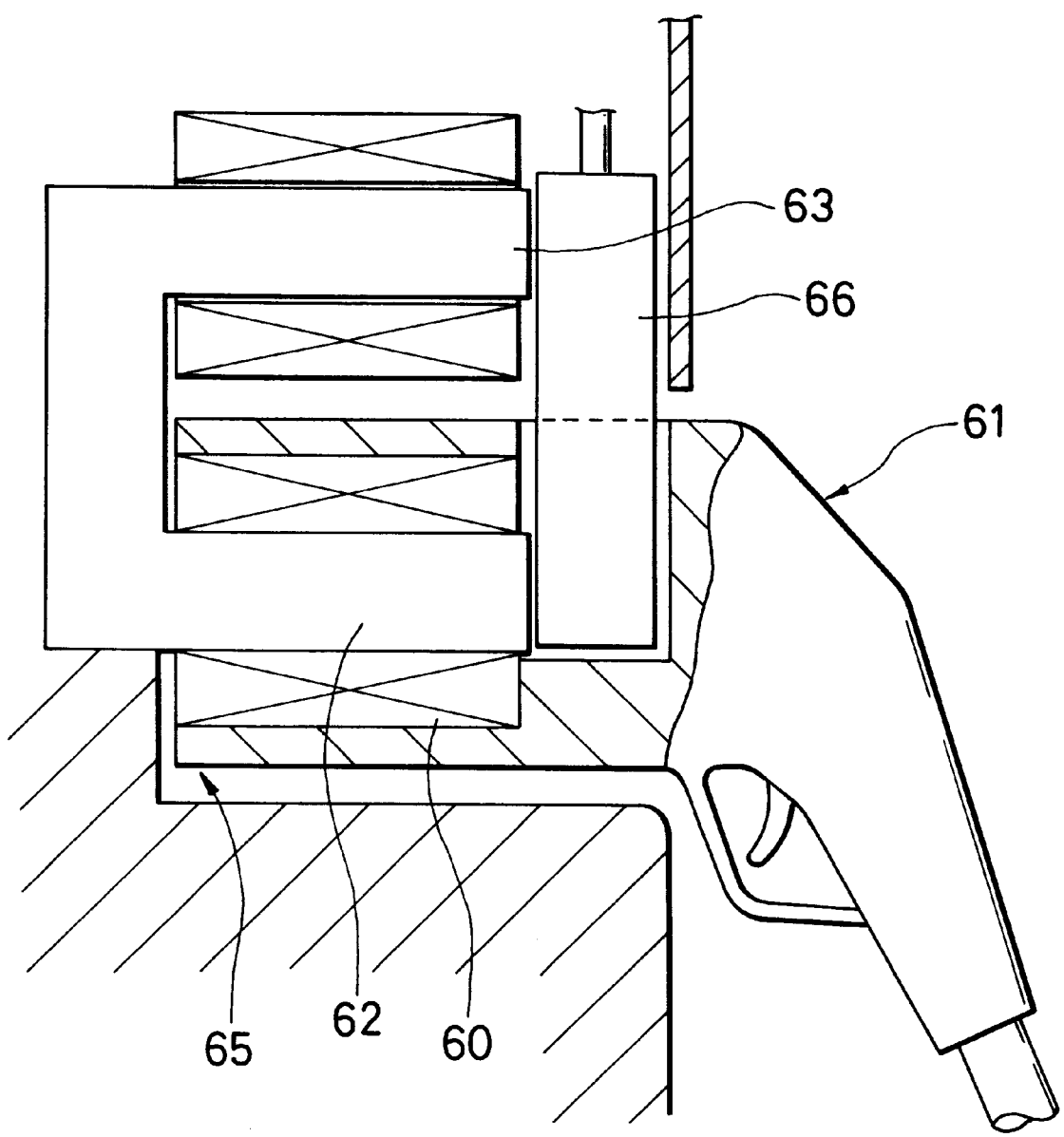
FIG. 6 is a cross-sectional view showing a condition in which the modified charging coupler is attached to the modified power receiving portion shown in FIG. 5.

(1) In the first and second embodiments of the invention, although the core is inserted into the air core portion 15 of the primary coil 13 after the charging coupler 10 is attached to the power receiving portion 20, a structure may be used in which the core is inserted into the air core portion of the primary coil in accordance with the attachment of the charging coupler. More specifically., as shown in FIGS. 5 and 6, an axis of a primary core 60 is disposed in a direction of attachment of a charging coupler 61 (as indicated by an arrow in FIG. 5), and a fixed core 63 has a horizontal portion 62 extending in the same direction. The charging coupler 61 is attached to a power receiving portion 65 in such a manner that the horizontal portion 62 of the fixed core 63 is fitted into an air core portion 64 of the primary core 60. When the charging coupler 61 is thus attached, a moving core 66 is moved to contact the fixed core 63 as shown in FIG. 6.

(2) In the first embodiment of the invention, the moving core 40 is held in sliding contact with the distal end surfaces 33 of the fixed core 30, thereby eliminating a gap between the contact surfaces of the two cores 30 and 40. However, for example, a structure may be used in which the two cores 30 and 40 are not held in sliding contact with each other, and instead one of the two cores 30 and 40 is movable in a direction to eliminate the gap between the contact surfaces, and the two cores are attracted toward each other by an electromagnetically-inducedmagnetic force, therebyeliminating the gap.

(3) In the first and second embodiments of the invention, the cores are provided at the electric car-side, thereby reducing the weight of the charging coupler. However, for example, the cores can be provided at the charging coupler, with no core being provided at the power receiving portion, that is, the electric car-side. With this structure, the weight of the electric car is reduced, so that the fuel consumption is improved.

What is claimed is:

1. A magnetic coupling device for charging an electric car, wherein a battery device of the electric car is charged by an external charging power source, the magnetic coupling device comprising:

a charging coupler having a primary coil connected to the external charging power source;

a power receiving portion provided at the electric car and connectable to the charging coupler, the power receiving portion having a secondary coil; and split cores provided at one of the power receiving portion and the charging coupler, the split cores being coupled together to form a magnetic circuit when the power receiving portion is connected to the charging coupler, the magnetic circuit passing through the primary coil and the secondary coil to electromagnetically couple the primary coil and the secondary coil;

wherein the battery device is charged by an electromotive force which is induced in the secondary coil when the primary coil is excited.

2. The magnetic coupling device according to claim 1, wherein the split cores include a fixed core and a moving core that is movable relative to the fixed core, the moving core being movable in a direction of an axis of the moving core for insertion into an air core portion of the primary coil.

3. The magnetic coupling device according to claim 2, wherein the fixed core includes a C-shaped bar having a square cross-section.

4. The magnetic coupling device according to claim 3, wherein the moving core includes a cylindrical bar having a square cross-section.

5. The magnetic coupling device according to claim 2, wherein each of the fixed core and the moving core includes an L-shaped bar.

6. The magnetic coupling device according to claim 1, wherein the split cores include a fixed core and a moving core that is movable relative to the fixed core, wherein an axis of the primary coil is parallel to a direction of attachment of the charging coupler and the power receiving portion, and the fixed core includes a horizontal portion that extends in the direction of attachment, the horizontal portion of the fixed core being insertable into an air core portion of the primary coil.

7. The magnetic coupling device according to claim 1, wherein the split cores include a fixed core and a moving core that is movable relative to the fixed core, the fixed core and the moving core being attracted toward each other by an electromagnetically-induced magnetic force to eliminate any gaps therebetween.

8. The magnetic coupling device according to claim 1, wherein the split cores are provided at the power receiving portion.

9. The magnetic coupling device according to claim 1, wherein the split cores are provided at the charging coupler.

* * * * *